United States Patent
Harrison et al.

(10) Patent No.: US 12,098,758 B2
(45) Date of Patent: Sep. 24, 2024

(54) THIN WING MULTI SLICE RGA ON LEADING EDGE

(71) Applicant: Goodrich Actuation Systems Limited, West Midlands (GB)

(72) Inventors: Colin R. Harrison, Wolverhampton (GB); Jonathan A. Darby, Westlands (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/573,744

(22) Filed: Jan. 12, 2022

(65) Prior Publication Data
US 2022/0228647 A1    Jul. 21, 2022

(30) Foreign Application Priority Data

Jan. 15, 2021 (EP) .................................. 21275003

(51) Int. Cl.
*F16H 1/46* (2006.01)
*F16H 1/32* (2006.01)

(52) U.S. Cl.
CPC ............... *F16H 1/46* (2013.01); *F16H 1/32* (2013.01)

(58) Field of Classification Search
CPC . F16H 1/46; F16H 1/32; F16H 37/041; B64C 13/34
See application file for complete search history.

(56) References Cited

U.S. PATENT DOCUMENTS

| 4,721,016 A | * | 1/1988 | Burandt | ................. F16H 1/46 475/342 |
| 4,848,663 A | * | 7/1989 | Sherbrooke | ............. B64C 13/34 475/83 |
| 5,518,466 A | | 5/1996 | Tiedeman | |
| 6,076,767 A | | 6/2000 | Farley et al. | |
| 6,875,145 B2 | | 4/2005 | McKay et al. | |

(Continued)

FOREIGN PATENT DOCUMENTS

| DE | 102019103693 A1 | 9/2019 |
| DE | 102019103954 A1 | 9/2019 |
| EP | 1475305 A2 | 11/2004 |

(Continued)

OTHER PUBLICATIONS

Abstract of DE102019103693A1, 1 Page, Sep. 5, 2019.

(Continued)

*Primary Examiner* — Sherry L Estremsky
(74) *Attorney, Agent, or Firm* — CANTOR COLBURN LLP

(57) ABSTRACT

A rotary geared actuator RGA includes an actuator body that has a gear or gears and means configured to rotate said gear or gears about a first central longitudinal axis X'. The RGA also includes a drive transmission shaft extending along a second central longitudinal axis X", means for rotating said drive transmission shaft about said central longitudinal axis X", and means for translating said rotation of said drive transmission shaft to said gears so as to cause rotation of said gears about said first central longitudinal axis X'. The second central longitudinal axis X" of said drive transmission shaft is laterally offset from said first central longitudinal axis X'.

4 Claims, 3 Drawing Sheets

(56) References Cited

U.S. PATENT DOCUMENTS 9,483,057 B2    11/2016  Dorr et al.
10,473,189 B2 *  11/2019  Isono .................... F16H 37/041

FOREIGN PATENT DOCUMENTS

| EP | 1475305 A3 | 4/2006 |
| EP | 3492776 A1 | 6/2019 |
| WO | 2010119280 A1 | 10/2010 |

OTHER PUBLICATIONS

DE102019103954 Abstract, 1 Page ; Sep. 19, 2019.
European Search Report for Application No. 21275003.8, mailed Jun. 15, 2021, 12 pages.

* cited by examiner

THIN WING MULTI SLICE RGA ON LEADING EDGE

CROSS-REFERENCE TO RELATED APPLICATIONS

This application claims priority to European Patent Application No. 21275003.8 filed Jan. 15, 2021, the entire contents of which is incorporated herein by reference.

BACKGROUND

Exemplary embodiments of the present disclosure pertain to the art of rotary geared actuators.

The wings of an aircraft can contain geared actuators. There is a requirement to fit geared actuators such as a multi-slice rotary geared actuator (RGA) within a thin wing section. Unfortunately, due to the fact that the wing root at the leading edge of the wing is so thin, it is not possible to fit such multi-slice RGAs at the leading edge of the wing.

The examples described herein therefore aim to RGAs that have a smaller envelope than conventional RGAs so that they can be fitted into the leading edge of an aircraft wing. The RGAs described herein could also be used in other mechanical equipment and are not limited to use in aircraft wings.

SUMMARY

In one embodiment, A rotary geared actuator RGA includes an actuator body comprising a gear or gears and means configured to rotate said gear or gears about a first central longitudinal axis X'. The RGA further comprises a drive transmission shaft extending along a second central longitudinal axis X", and means for rotating said drive transmission shaft about said central longitudinal axis X". The RGA further comprises means for translating said rotation of said drive transmission shaft to said gears so as to cause rotation of said gears about said first central longitudinal axis X', and wherein said second central longitudinal axis X" of said drive transmission shaft is laterally offset from said first central longitudinal axis X'.

In some examples described herein, the means configured to rotate said gear or gears about said first longitudinal axis X' comprises a shaft connected to said gear or gears.

In some examples described herein, said gear or gears may be positioned around a sun gear connecting shaft which extends along said first central longitudinal axis X'. The gears may comprise sun gears that are connected to said sun gear connecting shaft such that the sun gears operate as one.

In some examples described herein, the gears may further comprise pinion gears and ring gears and said pinion gears and ring gears may be positioned around the sun gear connecting shaft.

In some examples described herein, the first and second central longitudinal axes X', X" may extend parallel to each other.

In some examples described herein, the means for translating the rotation of the drive transmission shaft to the gear or gears may comprise an offset gearbox arrangement.

The offset gearbox arrangement may comprise an epicyclic, combined ring gear and housing that is connected to the laterally offset drive transmission shaft as well as connected to the sun gear connecting shaft.

A method for manufacturing a rotary geared actuator RGA is also described herein comprising: providing an actuator body comprising: a gear or gears and providing means configured to rotate said gear or gears about a first central longitudinal axis X'; and providing a drive transmission shaft extending along a second central longitudinal axis X", and providing means for rotating said drive transmission shaft about said central longitudinal axis X", and providing means for translating said rotation of said drive transmission shaft to said gears so as to cause rotation of said gears about said first central longitudinal axis X', and wherein said second central longitudinal axis X" of said drive transmission shaft is laterally offset from said first central longitudinal axis X'.

In some examples described herein, said means configured to rotate said gear or gears about said first longitudinal axis X' may comprise a shaft connected to said gear or gears.

In some examples described herein, the method may further comprise positioning said gear or gears around a sun gear connecting shaft which extends along said first central longitudinal axis X' and wherein said gears comprise sun gears and further comprising connecting said sun gears to said sun gear connecting shaft such that the sun gears operate as one.

In some examples described herein, the gears may further comprise pinion gears and ring gears and the method further comprises positioning said pinion gears and ring gears around the sun gear connecting shaft.

In some examples described herein, said first and second central longitudinal axes X', X" extend parallel to each other.

In some examples described herein, the means for translating the rotation of the drive transmission shaft to the gear or gears comprises an offset gearbox arrangement. In some examples this may comprise an epicyclic, combined ring gear and housing and the method further comprises connecting said epicyclic ring gear and housing to the laterally offset drive transmission shaft as well as to the sun gear connecting shaft.

BRIEF DESCRIPTION OF THE FIGURES

The following descriptions should not be considered limiting in any way. With reference to the accompanying drawings, like elements are numbered alike.

DETAILED DESCRIPTION

Figure 1:
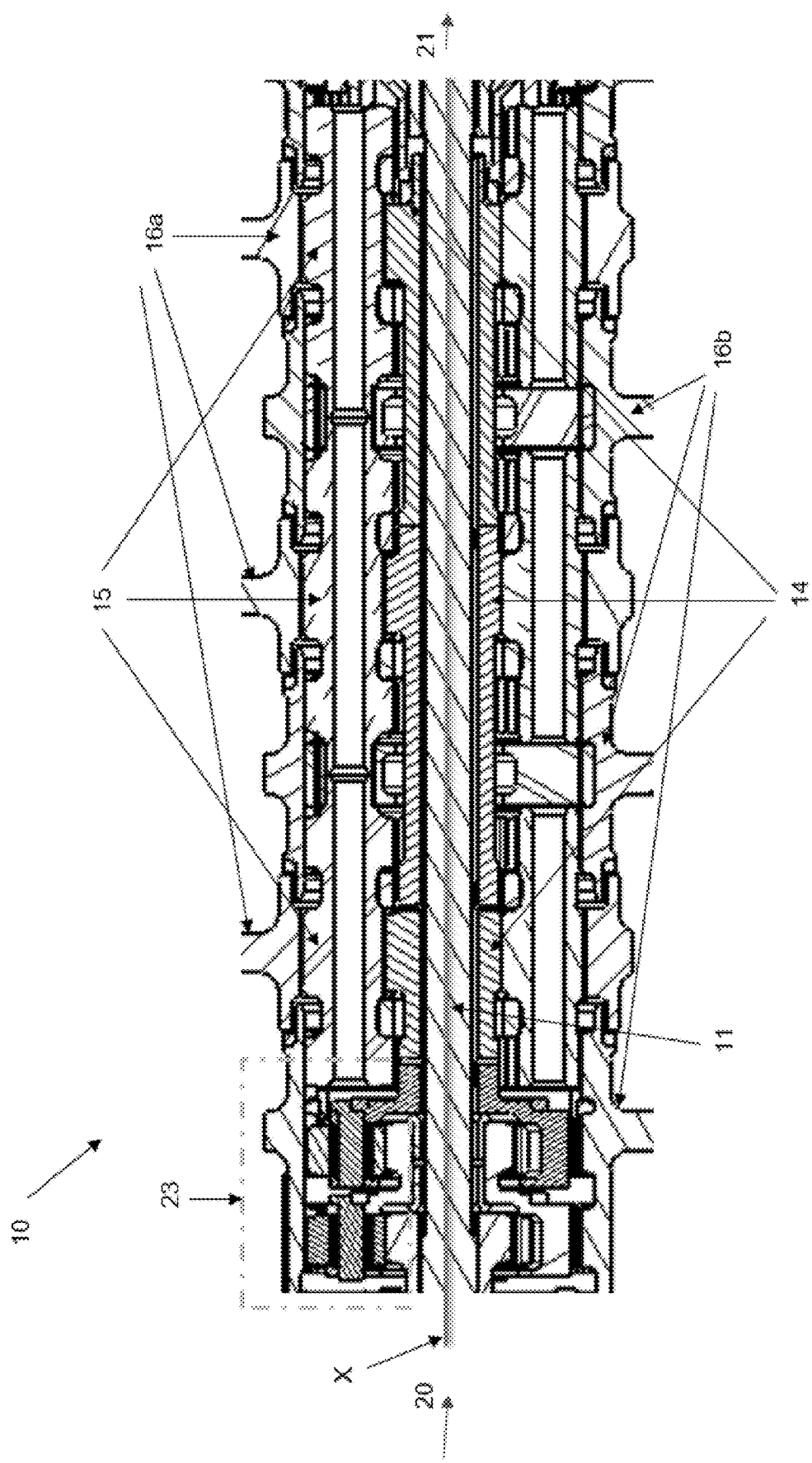
FIG. 1 shows a known RGA.

A known geared rotary actuator (RGA) 10 is shown in FIG. 1. Geared rotary actuators are often used in aircraft to move, and control the position of the flight control surfaces, such as the wings, of the aircraft. In FIG. 1, a known RGA 10 has a through drive transmission shaft 11 which is connected at one end to a drive means (not shown) at an input end 20 and which extends centrally through the main body of the actuator 10 to an output end 21 and drives the sun gears 14, pinion gears 15 and output ring gears 16a of the actuator 10. Earth ring gears 16b are also provided on the actuator 10, which are fixed in position and react to the torque of the output ring gears 16a. That is, the drive transmission shaft 11 extends along a central longitudinal axis X. As can be seen in FIG. 1, the sun gears 14, pinion gears 15 and ring gears 16a, 16b are arranged so as to be positioned around the circumference of the drive transmission shaft 11 so that when the drive transmission shaft 11 is rotated, the sun gears 14, pinion gears 15 and output ring gears 16a, also rotate about the central axis X of the drive transmission shaft 11. An offset gearbox 23 is also provided.

The through drive transmission shaft 11 therefore carries a certain amount of torque and so has to be sized accordingly. Due to this, the size of this shaft directly affects the overall size of the RGA outside diameter, meaning that it is not possible to be used in some thin wing applications.

The examples described herein are therefore aimed towards providing an improved RGA that has a smaller diameter than known RGAs so that they can be used in a thin wing of an aircraft (or other component).

Figure 2:
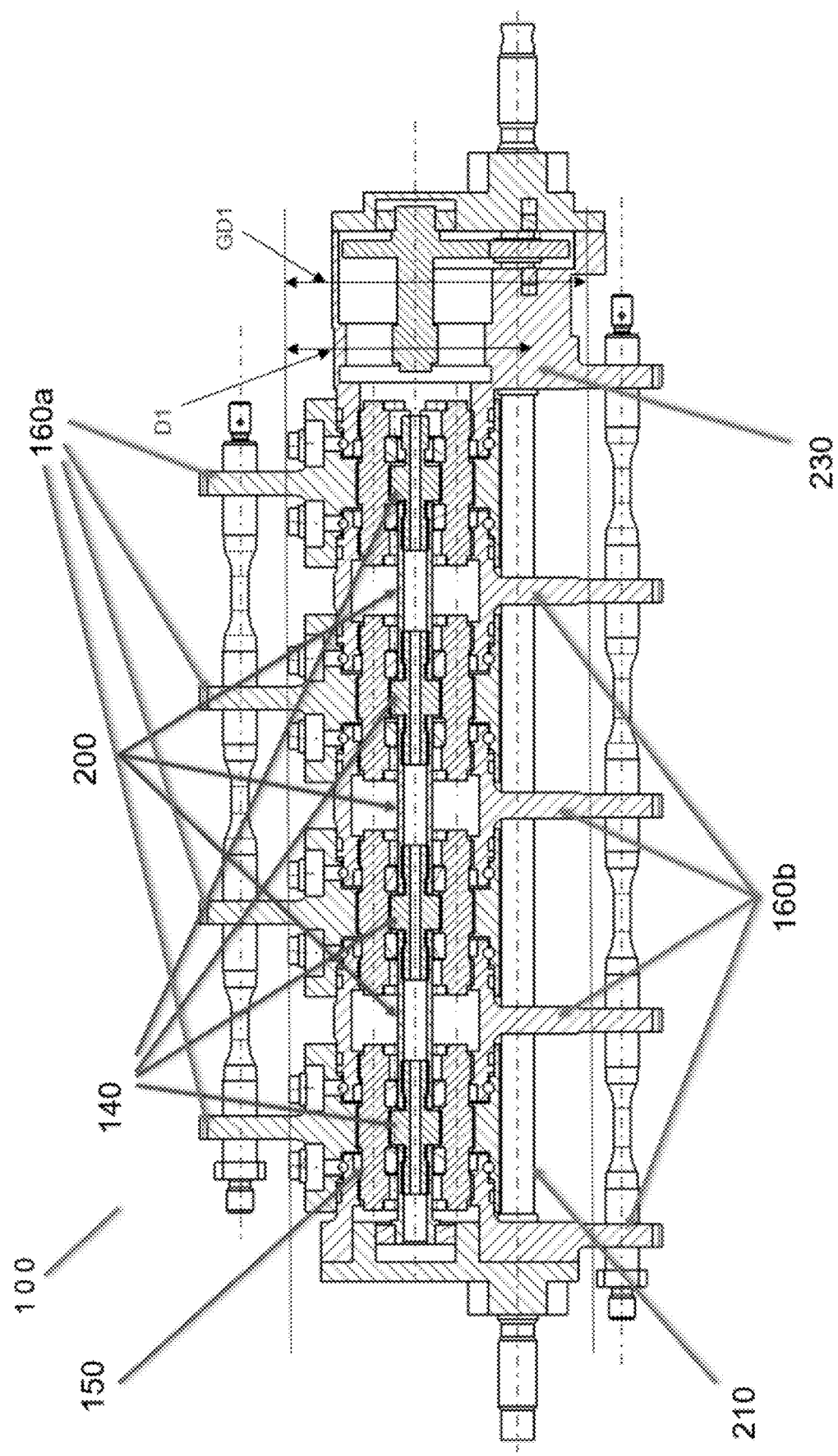
FIG. 2 shows a new type of RGA as described herein.

An example of a new type of RGA 100 is shown in FIG. 2, which depicts a cross-section of the RGA 100. As can be seen in this figure, the RGA 100 comprises a gear, or gears, such as sun gears 140, pinion gears 150 and ring gears 160a, 160b. In this example, however, instead of these gears being positioned around a through drive transmission shaft, as in the known example of FIG. 1, the sun gears 140 are positioned around the circumference of a sun gear connecting shaft 200. The sun gear connecting shaft 200 extends along a longitudinal axis X' and joins up all the sun gears 140 so that they operate as one. The gears 140, 150, 160a, 160b are also positioned around the sun gear connecting shaft 200 as shown in FIG. 2. In use, the sun gears 140 drive the pinion gears 150. There are multiple pinion gears 150 positioned around the sun gear 140. The pinion gears 150 drive the output ring gears 160a and the torque is then reacted by the output ring gears 160b.

The sun gear connecting shaft 200 of the actuator 100 in this example, however, is not a drive transmission shaft. Instead, in the new example shown in FIG. 2, the RGA comprises a separate drive transmission shaft 210 which has a longitudinal axis X" that is laterally offset from the longitudinal axis X' of the sun gear connecting shaft 200, so that it extends substantially parallel to the longitudinal axis X' of the sun gear connecting shaft 200 as shown in FIG. 2.

The drive transmission shaft 210 is, in turn, connected to means (not shown) for driving the sun gear connecting shaft 200 in a rotational direction about its central longitudinal axis X', and means, such as an offset gearbox arrangement 230 may be connected to the laterally offset drive transmission shaft 210, and further connected to the sun gear connecting shaft 200. When the drive transmission shaft 210 of the example of FIG. 2 is rotated, this rotation is therefore translated, via the offset gearbox arrangement 230 (or other suitable means) to the sun gear connecting shaft 200, so that the sun gear connecting shaft 200 is also rotated about its central, longitudinal axis X'. In some examples the offset gearbox may comprise an epicyclic combined ring gear and housing 250, 260 and the epicyclic ring gear and housing may be connected to the laterally offset drive transmission shaft as well as to the sun gear connecting shaft.

Figure 3:
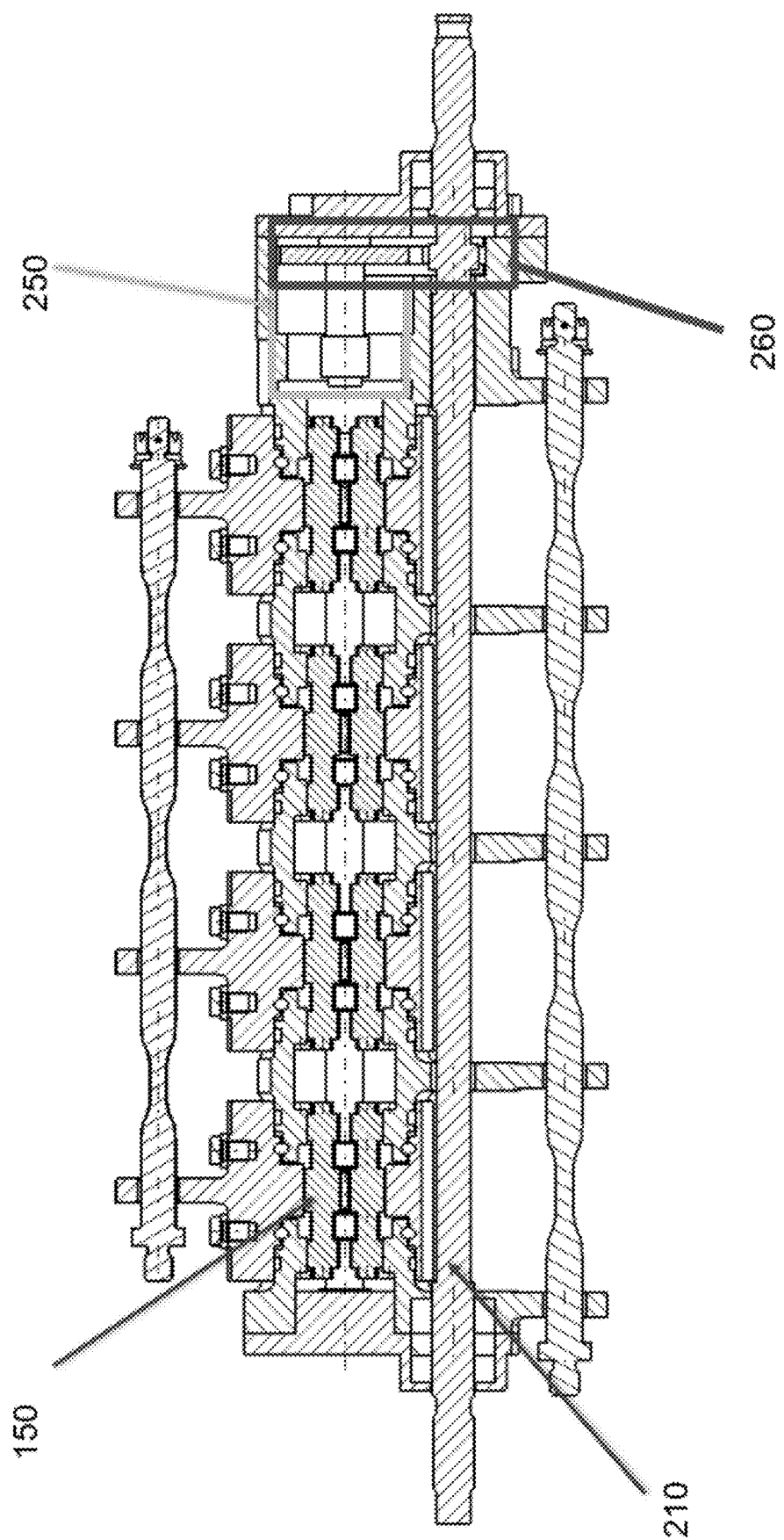
FIG. 3 shows a cross-section of the RGA of FIG. 2.

Due to the fact that the drive transmission shaft 210 is no longer positioned so as to extend centrally within the sun gears 140, pinion gears 150 and ring gears 160, but is instead laterally offset from those gears, the diameter D1 of the RGA can be greatly reduced, whilst the gearbox depth GDI is increased. Due to this the RGA 100 can be fitted into thinner wing sections Another view of the RGA shown in FIG. 2 is also shown in FIG. 3. In this figure, the connection of the drive transmission shaft 210 to an offset gearbox arrangement is more clearly shown.

Due to the fact that the drive shaft of these new examples shown in FIGS. 2 and 3 is located so as to be laterally offset from the axis of rotation X' of the gears, the examples described herein provide advantages over known actuators in that they provide an RGA with a reduced diameter. Due to this, the aircraft wing section can in turn be reduced in size, leading to huge benefits for both the system and aircraft performance. Since the drive shaft 210 is not contained in the main body of the actuator, as in known devices, the diameter of the actuator overall is reduced. This reduction in aircraft weight allows also for the wing section to be made thinner and more aerodynamic. The examples could also be used in any thin wing application, thereby providing key weight, efficiency and performance benefits. The examples described herein are discussed in relation to their use in an aircraft wing, however, they are not limited to this use, and could be used in any device or mechanism that requires the use of a RGA.

The invention claimed is:

1. A rotary geared actuator RGA comprising:
an actuator body comprising:
a plurality of gears; and
means configured to rotate said plurality of gears about a first central longitudinal axis X';
a drive transmission shaft extending along a second central longitudinal axis X";
means for rotating said drive transmission shaft about said second central longitudinal axis X"; and
means for translating said rotation of said drive transmission shaft to said gears so as to cause rotation of said gears about said first central longitudinal axis X';
wherein said second central longitudinal axis X" of said drive transmission shaft is laterally offset from said first central longitudinal axis X';
wherein the means configured to rotate said plurality gears comprises a sun gear connecting shaft;
wherein said sun gear connecting shaft extends along said first central longitudinal axis X';
wherein said plurality gears are positioned around said sun gear connecting shaft; and
wherein said plurality of gears comprise sun gears that are connected to said sun gear connecting shaft such that the sun gears operate as one;
wherein said plurality of gears comprise pinion gears and output ring gears and said pinion gears and output ring gears are positioned around said sun gear connecting shaft;
wherein, in use, the sun gears drive the pinion gears, and the pinion gears drive the output ring gears;
wherein the means for translating the rotation of the drive transmission shaft to the plurality of gears comprises an offset gearbox arrangement that is connected to the laterally offset drive transmission shaft as well as connected to the sun gear connecting shaft;
wherein said offset gearbox arrangement comprises an epicyclic combined ring gear and housing and said epicyclic combined ring gear and housing are connected to the laterally offset drive transmission shaft as well as to the sun gear connecting shaft,
wherein:
the actuator body extends from a first end of the RGA to a second end of the RGA;
the drive transmission shaft extends throughout the actuator body;
the offset gearbox arrangement is located at the second end of the RGA;
the sun gear connecting shaft extends from the first end of the actuator body to the offset gearbox arrangement;
all of the sun gears of the RGA are distributed along the sun gear connecting shaft. between the first end of the body and the offset gearbox arrangement, so that, during operation, all of the sun gears and all of the pinion gears of the RGA are located on a same lateral side of the drive transmission shaft.

2. The RGA of claim 1, wherein said first and second central longitudinal axes X', X" extend parallel to each other.

3. A method for manufacturing a rotary geared actuator RGA comprising:
   providing an actuator body that includes: a plurality of gears and means configured to rotate said plurality of gears about a first central longitudinal axis X';
   providing a drive transmission shaft extending along a second central longitudinal axis X" wherein said second central longitudinal axis X" of said drive transmission shaft is laterally offset from said first central longitudinal axis X';
   providing means for rotating said drive transmission shaft about said central longitudinal axis X"; and
   providing means for translating said rotation of said drive transmission shaft to said gears so as to cause rotation of said gears about said first central longitudinal axis X'.
   wherein said plurality of gears comprise sun gears,
   wherein the method further comprises:
   positioning said plurality of gears around a sun gear connecting shaft which extends along said first central longitudinal axis X'; and
   connecting said sun gears to said sun gear connecting shaft such that the sun gears operate as one:
   wherein said plurality of gears comprise pinion gears and ring gears and the method further comprises:
   positioning said pinion gears and ring gears around the sun gear connecting shaft so that the sun gears drive the pinion gears, and the pinion gears drive the output ring gears;
   wherein the means for translating the rotation of the drive transmission shaft to the plurality of gears comprises an offset gearbox arrangement;
   wherein said offset gearbox arrangement comprises an epicyclic combined ring gear and housing and the method further comprises:
   connecting said epicyclic combined ring gear and housing to the laterally offset drive transmission shaft as well as to the sun gear connecting shaft;
   wherein:
   the actuator body extends from a first end of the RGA to a second end of the RGA;
   the drive transmission shaft extends throughout the actuator body;
   the offset gearbox arrangement is located at the second end of the RGA;
   the sun gear connecting shaft extends from the first end of the actuator body to the offset gearbox arrangement;
   all of the sun gears of the RGA are distributed along the sun gear connecting shaft, between the first end of the body and the offset gearbox arrangement, so that, during operation, all of the sun gears and all of the pinion gears of the RGA are located on a same lateral side of the drive transmission shaft.

4. The method of claim 3, wherein said first and second central longitudinal axes X', X" extend parallel to each other.

* * * * *